Dec. 9, 1941.  F. M. ARCHIBALD  2,265,793
PREPARATION OF CHLORHYDRINS
Filed Nov. 4, 1939
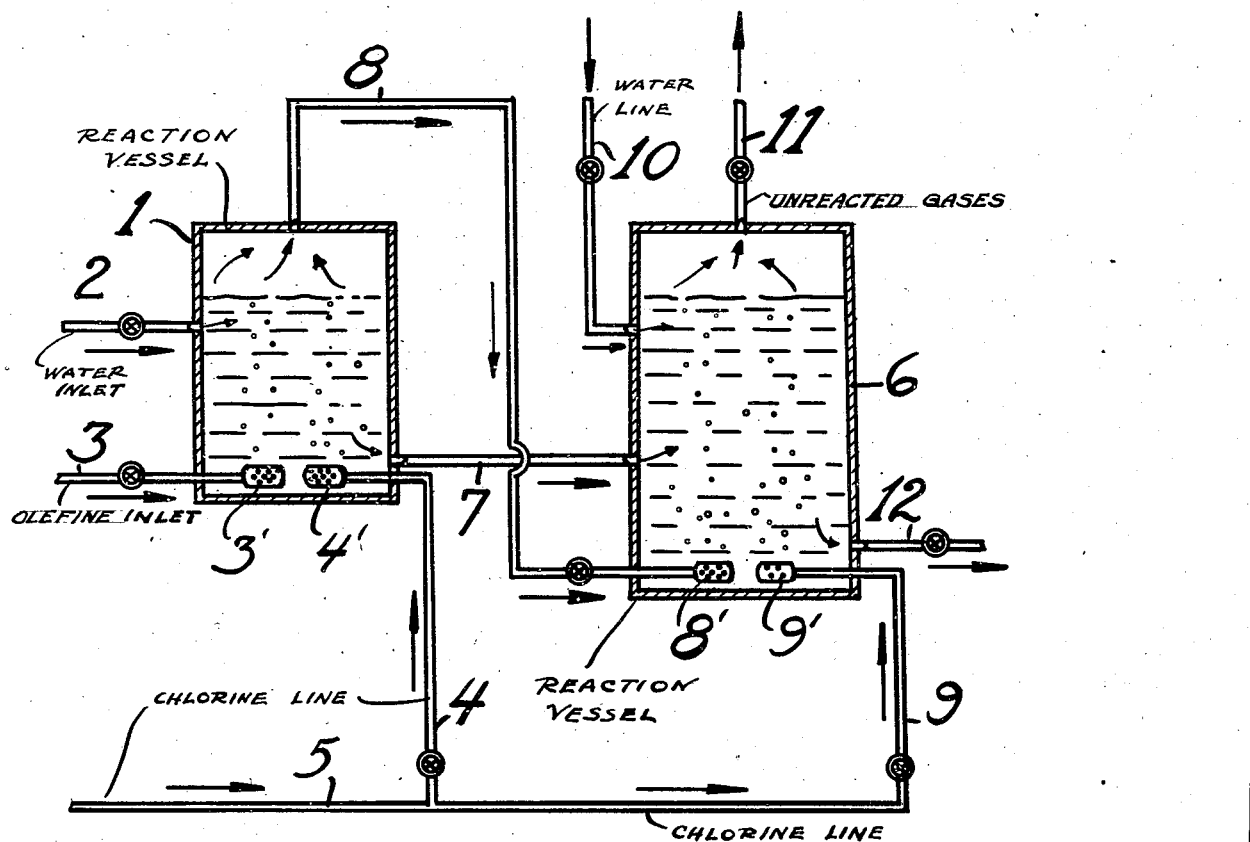
Francis M. Archibald Inventor
By P. L. Young Attorney Patented Dec. 9, 1941

2,265,793

UNITED STATES PATENT OFFICE 2,265,793

PREPARATION OF CHLORHYDRINS

Francis M. Archibald, Elizabeth, N. J., assignor to Standard Oil Development Company, a corporation of Delaware Application November 4, 1939, Serial No. 302,844

6 Claims. (Cl. 260—634)

This invention relates to the manufacture of chlorohydrins, and more particularly to an efficient process for the production of both ethylene chlorohydrin and propylene chlorohydrin by reacting a gaseous hydrocarbon mixture, containing both ethylene and propylene, with chlorine in the presence of water.

One of the methods which have been proposed for the manufacture of ethylene chlorohydrin consists in passing ethylene and chlorine simultaneously into water. In such a case the formation of ethylene chlorohydrin can be represented by the following equations:

$$Cl_2 + H_2O \rightarrow HOCl + HCl$$
$$C_2H_4 + HOCl \rightarrow CH_2ClCH_2OH$$

When it is attempted to apply such a method to the reaction of a mixture of ethylene and propylene, which is readily obtainable in admixture with light paraffin hydrocarbons in a gaseous by-product in the refining of cracked petroleum oils, with chlorine in the presence of water to form a mixture of ethylene chlorohydrin and propylene chlorohydrin in a single stage process, it is found that the yields are notably poor, owing to the fact that there is incomplete absorption of the olefin gases and to the fact that propylene is particularly inactive in the presence of an appreciable concentration of chlorohydrin. Any attempt to force the reaction of the propylene by using an excess of chlorine is accompanied by side reactions such as the formation of dichlorides.

An object of the invention is to provide a process whereby preparation of chlorohydrins by the above-described reaction may be carried out in two steps, each step being conducted under conditions favoring the reaction with one of the olefin hydrocarbons present, whereby the total absorption of the olefins is increased, side reactions largely eliminated, and the yields substantially improved. Other objects of the invention will appear from the description which follows.

The invention has its basis in the discovery that the reaction of propylene with the chlorine water is favored by a low concentration of chlorohydrins in the reaction solution, while the corresponding reaction of ethylene is favored by a higher concentration of chlorohydrins in the solution. In the first zone a gaseous mixture containing ethylene and propylene is passed into a body of water concurrently with a supply of chlorine. Means are provided for maintaining the concentration of chlorohydrins, which are formed in the reaction, at a low figure in this zone, preferably not higher than 3% of ethylene chlorohydrin, or the molal equivalent of propylene chlorohydrin or of a mixture of the two chlorohydrins. This may be accomplished, for example, by careful control of the relative rates of inflow of water and chlorine and the outflow of the solution formed. In this first stage most of the propylene present in the gaseous mixture will be absorbed and converted to propylene chlorohydrin. Some of the ethylene will react at the same time to form ethylene chlorohydrin. The unreacted portion of the gases is then passed into a second reaction zone concurrently with a new supply of chlorine. In the second zone the concentration of chlorohydrin product is maintained at a somewhat higher figure than in the first zone, preferably from 4% to 10%, calculated as ethylene chlorohydrin. Concentrations higher than 10% are not desirable, as there would be a tendency to form ethylene dichloride. The greater portion of the ethylene remaining in the gas mixture is converted to chlorohydrin in this zone. Owing to the sensitiveness of propylene to the formation of undesirable by-products, it is desirable to conduct the reaction in the first zone at a fairly low temperature, preferably not higher than 50° C. The temperature in the second zone may be somewhat higher, but should generally not be higher than 70° C. The reactions may conveniently be conducted at atmospheric pressure, although the invention is not limited to such pressure. By this process the yields of both ethylene chlorohydrin and propylene chlorohydrin are substantially greater than could be obtained by a similar process conducted in one reaction stage.

The invention may be applied to the reaction of any mixture of ethylene and propylene, whether mixed with inert gases or not, but it is particularly applicable to the treatment of the aforementioned light gases obtained from cracked petroleum products, such gases usually containing from 2% to 5% of ethylene and 10% to 20% of propylene, the remainder being chiefly ethane and propane, with a trace of methane, butane and hydrogen. Such a gas is known as "stabilizer gas," and is obtained as a by-product in the stabilization of cracked gasolines.

A preferred raw material is the product obtained by cracking propane or stabilizer gas at about 800° C. Such a product contains normally about 23% to 28% of ethylene and about 5% to 8% of propylene, also methane and hydrogen and small quantities of butadiene and aromatic hydrocarbons. The aromatic compounds are condensed out on cooling, and the butadiene may be removed by scrubbing the gas with sulfuric acid or an aqueous suspension of cuprous chloride.

Although the present invention is not restricted to a continuous process, it is very conveniently embodied in such a process, whereby the solution containing the reaction products of the first zone of reaction is passed to the second zone continuously and simultaneously with the gaseous residues from the first zone, the proper concentrations of chlorohydrins in the two zones being provided by careful control of the rates of inflow of water and outflow of products in both zones, or by any other suitable means.

A preferred embodiment of the invention, providing a continuous process, will now be described in detail in connection with the accompanying drawing. The drawing represents in schematic form the flow of materials throughout the process. Reaction vessel 1 represents the first zone of reaction. Water is supplied through line 2. The gas containing the mixture of olefins is supplied through line 3, and fine distribution of the gas through the liquid is provided by means of the porous thimble 3'. Similarly, chlorine is introduced through line 4, connected to a supply line 5, and the porous thimble 4'. Connecting pipe 7 provides for the flow of the liquid product from reactor 1 to a second reactor 6. Line 8 provides for carrying the unreacted gases from reactor 1 into the body of the liquid in reactor 6, a porous thimble 8' being provided for distribution of the gas through the liquid. Chlorine is introduced into reactor 6 through line 9 and porous thimble 9'. Additional water may be supplied to reactor 6 through line 10. The liquid products from reactor 6 are drawn off through line 12, and the unreacted gaseous residue through line 11. Where a cracked stabilizer gas containing 23% to 28% of ethylene and 5% to 8% of propylene is the raw material, it is ordinarily desirable, owing to the necessity of keeping the concentration of the chlorohydrin product at a low figure in the first reaction zone, to have reactor 1 of about one-third the cubic capacity of reactor 6.

Reactor 1 is filled to the desired level with water and the hydrocarbon gas and chlorine are admitted concurrently, the amount of chlorine being preferably controlled so that there will be no excess to escape through line 8. The water admitted to reactor 1 is preferably precooled to such a degree as will prevent the temperature in the reactor from rising above 50° C., or the proper cooling may be effected by providing a cooling coil in contact with the reaction mixture and circulating a cooling medium therethrough. Since the temperature in reactor 6 may be somewhat higher without danger of side reactions, there is ordinarily no necessity for further cooling of the liquid during the process, and it is therefore preferable in practice to maintain a higher temperature in the second reactor than in the first, and to maintain the temperature in reactor 6 between about 35° and about 70° C. The proper level of liquid may be maintained in the two reactors and the proper rate of flow maintained, in order to maintain a low concentration of chlorohydrin product in reactor 1, preferably not higher than 3%, calculated as ethylene chlorohydrin, by controlling the inflow of water through line 2 and outflow of solution through line 12. Separate control of the concentration of chlorohydrin in reactor 6, in order to maintain such concentration preferably between 4% and 10%, calculated as ethylene chlorohydrin, may be had by adding water at the proper rate to reactor 6 through line 10 and controlling the outflow of solution through line 12. The constant inflow of feed gases into reactor 1 will cause the unreacted residue of gases in the upper part of reactor 1 to pass out through line 8 and into reactor 6 through the porous thimble 8'. Additional chlorine is added through line 9 and thimble 9' to provide for further reaction with the residual olefins, chiefly ethylene, in reactor 6. The amount of chlorine introduced into reactor 6 is controlled so that there will be no loss of chlorine in the exit gases. The chlorohydrins in the mixture drawn off from reactor 6 through line 12 may be converted to the olefin oxides by neutralizing the solution with boiling milk of lime and then distilling. If desired, the two oxides thus formed my be separated by fractional distillation, or the mixture of the oxides may be treated directly with dilute acid for the preparation of a mixture of glycols.

The present invention is not to be considered as limited by any of the described examples, which are given by way of illustration only, but is to be considered as limited solely by the terms of the appended claims.

I claim:

1. The process of preparing chlorohydrins which comprises reacting a gaseous mixture containing ethylene and propylene, first, with an aqueous solution of chlorine containing an amount of a chlorohydrin containing not more than three carbon atoms which is chemically equivalent to not more than 3% by weight of ethylene chlorohydrin, and, second, with an aqueous solution of chlorine containing an amount of a chlorohydrin containing not more than three carbon atoms which is chemically equivalent to 4% to 10% by weight of ethylene chlorohydrin, and separating the resulting chlorohydrins from the aqueous solutions in which they are formed.

2. The process of preparing chlorohydrins which comprises reacting a gaseous mixture containing ethylene and propylene, first, with an aqueous solution of chlorine containing an amount of a chlorohydrin containing not more than three carbon atoms which is chemically equivalent to not more than 3% by weight of ethylene chlorohydrin and maintained at a temperature not higher than 50° C., and, second, with an aqueous solution of chlorine containing an amount of a chlorohydrin containing not more than three carbon atoms which is chemically equivalent to 4% to 10% by weight of ethylene chlorohydrin and maintained at a temperature not higher than 70° C., and separating the resulting chlorohydrins from the aqueous solution in which they are formed.

3. The process of preparing chlorohydrins which comprises reacting a gaseous mixture containing ethylene and propylene in two separately confined reaction zones, in the first of which the gaseous mixture is contacted with an aqueous solution of chlorine containing an amount of a chlorohydrin containing not more than three carbon atoms which is chemically equivalent to not more than 3% by weight of ethylene chlorohydrin, and in the second reaction zone the portion of the gaseous mixture unreacted in the first reaction zone is contacted with an aqueous solution of chlorine containing an amount of a chlorohydrin containing not more than three carbon atoms which is chemically equivalent to 4% to 10% by weight of ethylene chlorohydrin, and separating the resulting chlorohydrins from the aqueous solution in which they are formed.

4. The process of preparing chlorohydrins which comprises reacting a gaseous mixture containing ethylene and propylene in two separately confined reaction zones, in the first of which the gaseous mixture is contacted with an aqueous solution of chlorine containing an amount of a chlorohydrin containing not more than three carbon atoms which is chemically equivalent to not more than 3% by weight of ethylene chlorohydrin and maintained at a temperature not higher than 50° C., and in the second reaction zone the gaseous mixture unreacted in the first reaction zone is contacted with an aqueous solution of chlorine containing an amount of a chlorohydrin containing not more than three carbon atoms which is chemically equivalent to 4% to 10% by weight of ethylene chlorohydrin and maintained at a temperature not higher than 70° C., and separating the resulting chlorohydrins from the aqueous solution in which they are formed.

5. The process of preparing a mixture of ethylene chlorohydrin and propylene chlorohydrin which comprises continuously passing chlorine, water and a gaseous hydrocarbon mixture containing ethylene and propylene into a first reaction zone maintained at a temperature not higher than 50° C., where a portion of the said hydrocarbon mixture is converted to chlorohydrins, controlling the inflow of water and outflow of solution relative to the inflow of reacting gases so as to maintain in said first reaction zone a concentration of the chlorohydrins formed which is chemically equivalent to not more than 3% by weight of ethylene chlorohydrin, continuously passing the resulting solution simultaneously with the residual gases from the first reaction zone to a second reaction zone maintained at a temperature not higher than 70° C., continuously passing chlorine and water into the second reaction zone and controlling such inflow of chlorine and water and outflow of solution so as to maintain in said second reaction zone a concentration of chlorohydrins which is chemically equivalent to 4% to 10% by weight of ethylene chlorohydrin, and recovering the chlorohydrins from the solution formed in the second reaction zone.

6. The process of preparing a mixture of ethylene chlorohydrin and propylene chlorohydrin which comprises continuously passing chlorine, water and a gaseous hydrocarbon mixture containing about 23% to about 28% of ethylene and about 5% to about 8% of propylene into a first reaction zone maintained at a temperature not higher than 50° C., where a portion of the said hydrocarbon mixture is converted to chlorohydrins, controlling the inflow of water and outflow of solution relative to the inflow of reacting gases so as to maintain in said first reaction zone a concentration of the chlorohydrins formed which is chemically equivalent to not more than 3% by weight of ethylene chlorohydrin, continuously passing the resulting solution simultaneously with the residual gases from the first reaction zone to a second reaction zone maintained at a temperature of about 35° to about 70° C., continuously passing chlorine and water into the second reaction zone and controlling such inflow of chlorine and water and outflow of solution so as to maintain in said second reaction zone a concentration of chlorohydrins which is chemically equivalent to 4% to 10% by weight of ethylene chlorohydrin, maintaining the temperature of the second reaction zone higher than that in the first reaction zone, and recovering the chlorohydrins from the solution formed in the second reaction zone.

FRANCIS M. ARCHIBALD.